United States Patent
Kuo

(10) Patent No.: US 11,290,579 B2
(45) Date of Patent: Mar. 29, 2022

(54) COMMUNICATION SYSTEM, COMMUNICATION METHOD, AND MAC CIRCUIT

(71) Applicant: Realtek Semiconductor Corporation, Hsinchu (TW)

(72) Inventor: Nai-Chang Kuo, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/910,310

(22) Filed: Jun. 24, 2020

(65) Prior Publication Data

US 2021/0176348 A1    Jun. 10, 2021

(30) Foreign Application Priority Data

Dec. 9, 2019    (TW) .................................. 108144972

(51) Int. Cl.
| | |
|---|---|
| *H04L 69/324* | (2022.01) |
| *H04L 69/323* | (2022.01) |
| *H04L 12/40* | (2006.01) |
| *H04W 80/02* | (2009.01) |
| *H04W 28/06* | (2009.01) |

(52) U.S. Cl.
CPC ...... *H04L 69/324* (2013.01); *H04L 12/40136* (2013.01); *H04L 69/323* (2013.01); *H04W 28/06* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 7,782,805 B1 | 8/2010 | Belhadj et al. | |
| 2006/0153238 A1* | 7/2006 | Bar-On | H04L 12/40 370/473 |
| 2007/0165663 A1* | 7/2007 | Aloni | H04L 41/12 370/420 |
| 2008/0181212 A1* | 7/2008 | Curcio | H04L 12/66 370/389 |
| 2010/0115117 A1* | 5/2010 | Diab | H04L 12/12 709/230 |
| 2015/0326504 A1* | 11/2015 | Yu | H04L 49/30 370/392 |
| 2017/0093715 A1* | 3/2017 | McGhee | H04L 45/745 |
| 2018/0181525 A1* | 6/2018 | Iyer | G06F 13/382 |
| 2020/0403824 A1* | 12/2020 | Benyamin | G06F 1/3203 |

FOREIGN PATENT DOCUMENTS

| | | |
|---|---|---|
| CN | 101304296 A | 11/2008 |
| TW | 200845686 A | 11/2008 |

* cited by examiner

*Primary Examiner* — Diane L Lo
(74) *Attorney, Agent, or Firm* — Locke Lord LLP; Tim Tingkang Xia, Esq.

(57) ABSTRACT

A communication system includes a medium access control circuit and at least one physical layer circuit. The at least one physical layer circuit is coupled to the medium access control circuit. The medium access control circuit sends a control command to the at least one physical layer circuit via a SERDES interface. In response to the control command, the at least one physical layer circuit sends physical layer data to the medium access control circuit via the SERDES interface.

18 Claims, 3 Drawing Sheets

COMMUNICATION SYSTEM, COMMUNICATION METHOD, AND MAC CIRCUIT

RELATED APPLICATIONS

This application claims priority to Taiwanese Application Ser. No. 108144972, filed Dec. 9, 2019, which is herein incorporated by reference.

BACKGROUND

Technical Field

The present disclosure relates to a communication technology. More particularly, the present disclosure relates to a communication system, a communication method, and a medium access control (MAC) circuit.

Description of Related Art

With developments of technology, various electrical devices are applied in many technology fields. Two electrical devices can transmit data to each other by the communication technologies.

In some related approaches, a medium access control (MAC) circuit communicates with a physical layer circuit via multiple interfaces. However, in these related approaches, interference between signals often occurs, and cost is higher.

SUMMARY

Some aspects of the present disclosure are to provide a communication system. The communication system includes a medium access control (MAC) circuit and at least one of physical layer circuit. The at least one of physical layer circuit is coupled to the MAC circuit. The MAC circuit sends a control command to the at least one of physical layer circuit via a SERDES interface. In response to the control command, the at least one of physical layer circuit sends back physical layer data to the MAC circuit via the SERDES interface.

Some aspects of the present disclosure are to provide a communication method. The communication method includes the following steps: sending a control command to at least one of physical layer circuit via a SERDES interface by a MAC circuit; and in response to the control command, sending back physical layer data to the MAC circuit via the SERDES interface by at least one of physical layer circuit.

Some aspects of the present disclosure are to provide a MAC circuit. The MAC circuit is coupled to at least one of physical layer circuit. The MAC circuit is configured to send a control command to the at least one of physical layer circuit via a SERDES interface. In response to the control command, the MAC circuit receives physical layer data from the at least one of physical layer circuit via the SERDES interface.

As described above, the communication system, the communication method, and the MAC circuit of the present disclosure can maintain signal integrity and reduce cost.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in part of embodiments of the present embodiments. Furthermore, for simplifying the drawings, some of the conventional structures and elements are shown with schematic illustrations.

It will be further understood that the terms "comprises" and/or "comprising", or "includes" and/or "including" or "has" and/or "having" when used in the present disclosure, specify the presence of stated features, regions, integers, steps, operations, elements, and/or components, but do not preclude the presence or addition of one or more other features, regions, integers, steps, operations, elements, components, and/or groups thereof.

In the present disclosure, "connected" or "coupled" may refer to "electrically connected" or "electrically coupled." "Connected" or "coupled" may also refer to operations or actions between two or more elements.

Figure 1:
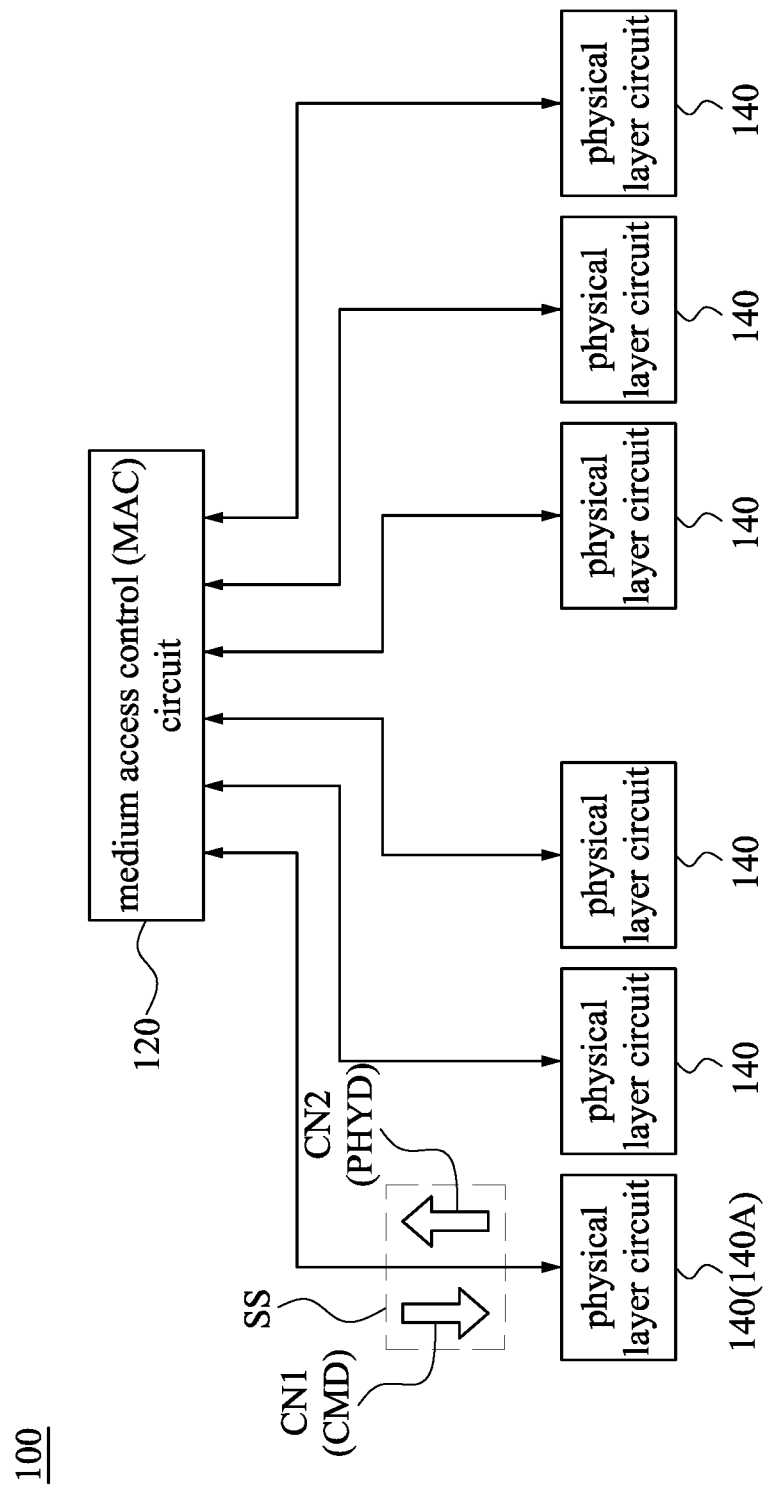
FIG. 1 is a schematic diagram of a communication system according to some embodiments of the present disclosure.

Reference is made to FIG. 1. FIG. 1 is a schematic diagram of a communication system 100 according to some embodiments of the present disclosure. In some embodiments, the communication system 100 is applied in a network switch system, but the present disclosure is not limited thereto. Various applications are within the contemplated scopes of the present disclosure.

The communication system 100 includes a medium access control (MAC) circuit 120 and at least one physical layer circuit 140. As illustrated in FIG. 1, the communication system 100 includes a plurality of physical layer circuits 140. For example, in FIG. 1, there are six physical layer circuits 140.

The aforementioned quantity of the physical layer circuits 140 is for illustration. Various quantities of the physical layer circuit 140 are within the contemplated scopes of the present disclosure.

Each of the physical layer circuit 140 is coupled to the medium access control circuit 120 via a communication interface SS. The communication interface SS is a SERDES interface. The communication interface SS includes a channel CN1 and a channel CN2.

The aforementioned quantity of the channels is for illustration. Various quantities of the channels are within the contemplated scopes of the present disclosure.

Since the physical layer circuits 140 have similar operations, the physical layer circuit 140A is taken as an example and described in following paragraphs for ease of understanding.

In operation, as illustrated in FIG. 1, the medium access control circuit 120 sends a control command CMD to the physical layer circuit 140A via the channel CN1 of the communication interface SS. In response to the received control command CMD, the physical layer circuit 140A sends back physical layer data PHYD to the medium access control circuit 120 via the channel CN2 of the communication interface SS.

In some embodiments, the physical layer data PHYD records a status of the physical layer circuit 140A, link up information, link down information, or an operation speed, but the present disclosure is not limited thereto. Various data are within the contemplated scopes of the present disclosure.

In some related approaches, the medium access control circuit 120 communicates with each of the physical layer circuits 140 via multiple different communication interfaces. For example, in theses related approaches, frame data is sent to the medium access control circuit 120 or the physical layer circuit 140 via the communication interface SS, the medium access control circuit 120 sends the control command CMD to the physical layer circuit 140A via other interfaces (for example, Management Data Clock (MDC) interface or Management Data Input/Output (MDIO) interface), and the physical layer circuit 140A sends back the physical layer data PHYD to the medium access control circuit 120 via these other interfaces. Compared to the high-speed communication interface SS (SERDES interface), speed of MDC interface and MDIO interface is slower. Accordingly, in these related approaches, if the routes on a printed circuit board (PCB) are not properly designed, signals transmitted on the high-speed communication interface SS and signals transmitted on the low-speed communication interface are interfered. Moreover, since different kinds of communication interfaces are configured on the printed circuit board, cost of the chip and design difficulty are increased.

Compared to aforementioned related approaches, the communication system 100 of the present disclosure utilizes the communication interface SS (SERDES interface) to complete not only the operations of transmitting packets to the medium access control circuit 120 and the physical layer circuit 140A, but also the operations of sending the control command CMD to the physical layer circuit 140A and sending back the physical layer data PHYD to the medium access control circuit 120. Accordingly, the communication system 100 of the present disclosure has no need to design other interfaces (for example, MDC interface and MDIO interface).

Since only the communication interface SS is used, the communication system 100 of the present disclosure can prevent signals having different speeds from affecting each other. In addition, the communication system 100 of the present disclosure can prevent other interfaces (for example, MDC interface and MDIO interface) from affecting accuracy of a power plane and a ground plane of the printed circuit board. Furthermore, since the physical layer data PHYD is transmitted via the high-speed communication interface SS (SERDES interface), the medium access control circuit 120 can receive the physical layer data PHYD in real time.

On the other hand, the communication system 100 of the present disclosure can decrease layout difficulty of the routes on the printed circuit board, reduce the layer number of the printed circuit board, reduce cost of the printed circuit board, shrink a size of the chip, and reduce cost of the chip. Further, since these other interfaces (for example, MDC interface and MDIO interface) can be omitted, the medium access control circuit 120 and the physical layer circuit 140 of the present disclosure can be without pins of these other interfaces. Accordingly, package cost can be reduced.

Generally, more physical layer circuits 140 are configured in a large network switch system. In the aforementioned related approaches, it needs one communication interface SS (SERDES interface) and one other interface (for example, MDC interface and MDIO interface) between the medium access control circuit 120 and each of the physical layer circuits 140. The communication system 100 of the present disclosure can only have the communication interface SS. Accordingly, if the communication system 100 of the present disclosure is adopted in the large network switch system, more other interfaces (for example, MDC interface and MDIO interface) are omitted, such that the aforementioned advantages are remarkable.

Figure 2:
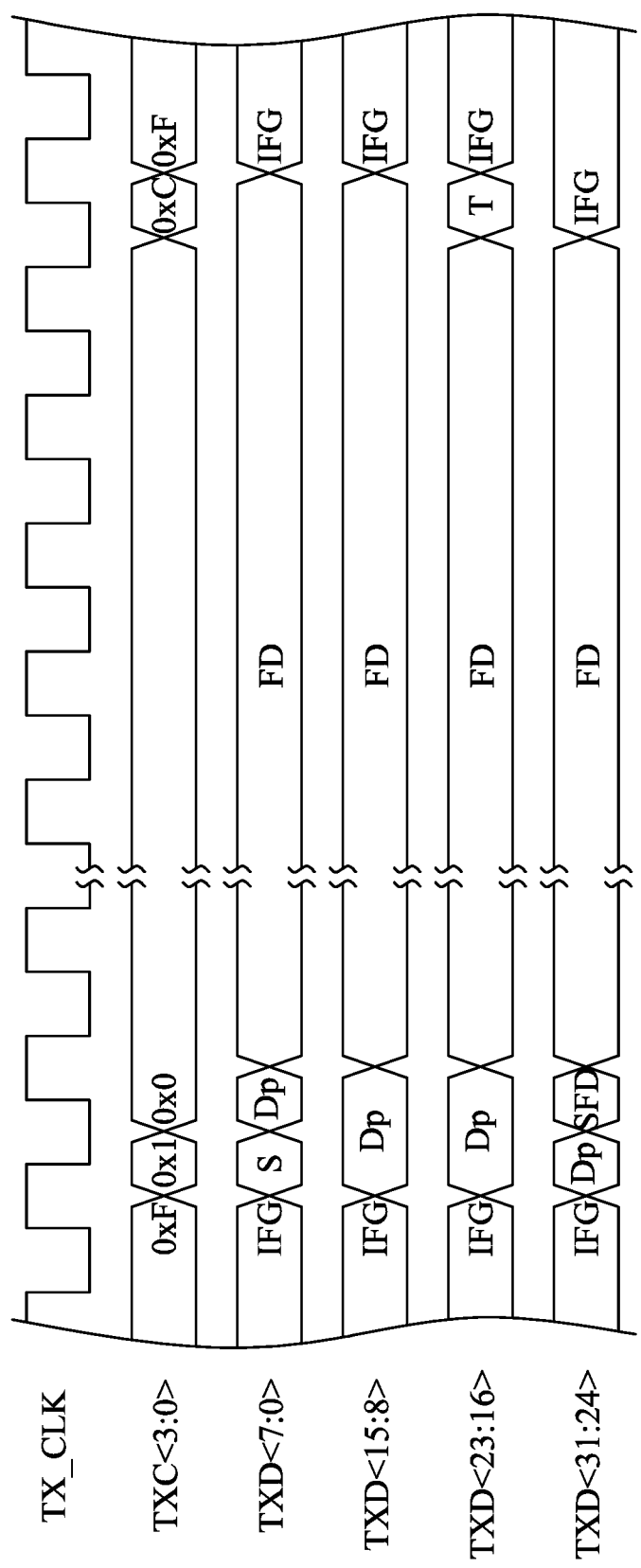
FIG. 2 is a schematic diagram of a packet stream according to some embodiments of the present disclosure.

Then, references are made to FIG. 1 and FIG. 2. FIG. 2 is a schematic diagram of a packet stream according to some embodiments of the present disclosure. FIG. 2 illustrates the packet stream in a transmission process. The packet stream includes a signal TX_CLK, a signal TXC<3:0>, a signal TXD<7:0>, a signal TXD<15:8>, a signal TXD<23:16>, and a signal TXD<31:24>. A packet stream in a receiving process has a similar data structure.

The "transmission process" is that the medium access control circuit 120 sends the control command CMD to the physical layer circuit 140A via the channel CN1. The "receiving process" is that the physical layer circuit 140A sends back the physical layer data PHYD to the medium access control circuit 120 via the channel CN2. In other words, the transmission process and the receiving process are performed via the different channels of the communication interface SS respectively.

As illustrated in FIG. 2, the signal TX_CLK is a clock signal of the transmission process. The signal TXC<3:0> has four bits, and the bits are configured to control the signal TXD<7:0>, the signal TXD<15:8>, the signal TXD<23:16>, and the signal TXD<31:24> respectively.

The signal TXD<7:0>, the signal TXD<15:8>, the signal TXD<23:16>, and the signal TXD<31:24> have a similar format. In specific, the field S records at least one start control character. The field T records at least one terminate control character. The field Dp records at least one preamble data octet. The field SFD records at least one start frame data. The field FD records at least one frame data.

In the standard IEEE802.3, an inter frame gap IFG is defined between two packets. The communication system 100 of the present disclosure, in the transmission process, the control command CMD from the medium access control circuit 120 is configured in the inter frame gap IFG based on an in-band register access technology. In other words, the inter frame gap IFG, transmitted via the channel CN1 and being idle region in the related approaches, is converted into in-band register access code, to carry the control command CMD.

Similarly, in the receiving process, the physical layer data PHYD from the physical layer circuit 140A is configured in the inter frame gap IFG based on the in-band register access technology, such that the inter frame gap IFG, transmitted via the channel CN2 and being idle region in the related approaches, is converted into in-band register access code, to carry the physical layer data PHYD.

As described above, in some related approaches, the frame data is transmitted via the communication interface SS (SERDES interface), and the control command CMD and the physical layer data PHYD are transmitted via other communication interfaces (for example, MDC interface and MDIO interface).

Compared to these related approaches, the control command CMD and the physical layer data PHYD of the present disclosure are carried in the inter frame gap IFG between two packets, and the inter frame gap IFG of these related approaches is idle region. Accordingly, the control command CMD and the physical layer data PHYD are transmitted via the same communication interface SS (SERDES interface)

under a condition that the frame data in the field FD is not affected, to omit other communication interfaces (for example, MDC interface and MDIO interface).

Figure 3:
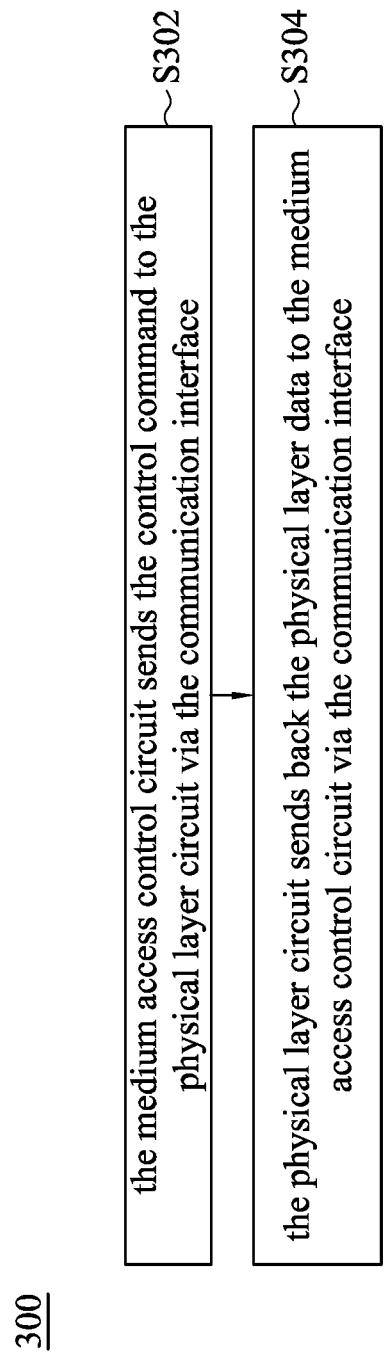
FIG. 3 is a flow diagram illustrating a communication method according to some embodiments of the present disclosure.

Reference is made to FIG. 3. FIG. 3 is a flow diagram illustrating a communication method 300 according to some embodiments of the present disclosure. The communication method 300 includes an operation S302 and an operation S304.

In some embodiments, the communication method 300 is applied in the communication system 100 in FIG. 1, but the present disclosure is not limited thereto. For ease of understanding, the communication method 300 is described with reference to FIG. 1.

In operation S302, the medium access control circuit 120 sends the control command CMD to the physical layer circuit 140A via the communication interface SS. The communication interface SS is SERDES interface.

In operation S304, in response to the control command CMD, the physical layer circuit 140A sends back the physical layer data PHYD to the medium access control circuit 120 via the communication interface SS. In some embodiments, the control command CMD and the physical layer data PHYD are carried in the inter frame gap IFG, such that the control command CMD and the physical layer data PHYD are transmitted via the same communication interface SS (SERDES interface) under a condition that the frame data in the field FD is not affected.

The above description of the communication method 300 includes exemplary operations, but the operations of the communication method 300 are not necessarily performed in the order described. The order of the operations of the communication method 300 disclosed in the present disclosure are able to be changed, to be added, to be replaced, to be omitted, or the operations are able to be executed simultaneously or partially simultaneously as appropriate, in accordance with the spirit and scope of various embodiments of the present disclosure.

As described above, the communication system, the communication method, and the MAC circuit of the present disclosure can maintain signal integrity and reduce cost.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuity in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A communication system, comprising:
a medium access control (MAC) circuit; and
at least one of physical layer circuit coupled to the MAC circuit,
wherein in a transmission process, the MAC circuit sends a control command to the at least one of physical layer circuit via a SERDES interface,
wherein in response to the control command, the at least one of physical layer circuit sends back physical layer data to the MAC circuit via the SERDES interface,
wherein a control signal corresponding to the transmission process comprises four control bits, and the four control bits of the control signal are configured to control a first data signal, a second data signal, a third data signal, and a fourth data signal respectively to implement the transmission process,
wherein each of the first data signal, the second data signal, the third data signal, and the fourth data signal comprises a frame data field and a preamble data octet field,
wherein the first data signal further comprises a start control character field, the third data signal further comprises a terminate control character field, and the fourth data signal further comprises a start frame data field.

2. The communication system of claim 1, wherein in the transmission process, the control command is configured in an inter frame gap between a first packet and a second packet.

3. The communication system of claim 1, wherein in a receiving process, the physical layer data is configured in an inter frame gap between a first packet and a second packet.

4. The communication system of claim 1, wherein the SERDES interface comprises a first channel and a second channel, and the MAC circuit sends the control command to the at least one of physical layer circuit via the first channel.

5. The communication system of claim 4, wherein the at least one of physical layer circuit sends back the physical layer data to the MAC circuit via the second channel.

6. The communication system of claim 1, wherein the at least one of physical layer circuit comprises a plurality of physical layer circuits.

7. A communication method, comprising:
sending a control command to at least one of physical layer circuit via a SERDES interface by a MAC circuit in a transmission process; and
in response to the control command, sending back physical layer data to the MAC circuit via the SERDES interface by at least one of physical layer circuit,
wherein a control signal corresponding to the transmission process comprises four control bits, and the four control bits of the control signal are configured to control a first data signal, a second data signal, a third data signal, and a fourth data signal respectively to implement the transmission process,
wherein each of the first data signal, the second data signal, the third data signal, and the fourth data signal comprises a frame data field and a preamble data octet field,
wherein the first data signal further comprises a start control character field, the third data signal further comprises a terminate control character field, and the fourth data signal further comprises a start frame data field.

8. The communication method of claim 7, wherein in the transmission process, the control command is configured in an inter frame gap between a first packet and a second packet.

9. The communication method of claim 7, wherein in a receiving process, the physical layer data is configured in an inter frame gap between a first packet and a second packet.

10. The communication method of claim 7, wherein sending the control command to the at least one of physical layer circuit comprises:
    sending the control command to the at least one of physical layer circuit via a first channel of the SERDES interface by the MAC circuit.

11. The communication method of claim 10, wherein sending back the physical layer data to the MAC circuit comprises:
    sending back the physical layer data to the MAC circuit via a second channel of the SERDES interface by the at least one of physical layer circuit.

12. The communication method of claim 7, wherein the at least one of physical layer circuit comprises a plurality of physical layer circuits.

13. A MAC circuit coupled to at least one of physical layer circuit, wherein the MAC circuit is configured to send a control command to the at least one of physical layer circuit via a SERDES interface in a transmission process, wherein in response to the control command, the MAC circuit receives physical layer data from the at least one of physical layer circuit via the SERDES interface,
    wherein a control signal corresponding to the transmission process comprises four control bits, and the four control bits of the control signal are configured to control a first data signal, a second data signal, a third data signal, and a fourth data signal respectively to implement the transmission process,
    wherein each of the first data signal, the second data signal, the third data signal, and the fourth data signal comprises a frame data field and a preamble data octet field,
    wherein the first data signal further comprises a start control character field, the third data signal further comprises a terminate control character field, and the fourth data signal further comprises a start frame data field.

14. The MAC circuit of claim 13, wherein the SERDES interface comprises a first channel and a second channel, and the MAC circuit sends the control command to the at least one of physical layer circuit via the first channel.

15. The MAC circuit of claim 14, wherein the MAC circuit receives the physical layer data via the second channel.

16. The MAC circuit of claim 13, wherein in the transmission process, the control command is configured in an inter frame gap between a first packet and a second packet.

17. The MAC circuit of claim 13, wherein in a receiving process, the physical layer data is configured in an inter frame gap between a first packet and a second packet.

18. The MAC circuit of claim 13, wherein the at least one of physical layer circuit comprises a plurality of physical layer circuits.

* * * * *